2,982,663
Patented May 2, 1961

2,982,663
METHOD OF PRODUCING EGG ALBUMEN SOLIDS WITH LOW BACTERIA COUNT

Dwight H. Bergquist, Springfield, Mo., assignor to Henningsen, Inc., New York, N.Y., a corporation of Texas No Drawing. Filed Aug. 21, 1958, Ser. No. 756,315

3 Claims. (Cl. 99—210)

This invention relates to a method of reducing the bacterial counts of egg white solids and more particularly to a method of reducing the bacterial counts of egg white solids to levels below 1,000 total bacteria per gram and of eliminating the danger caused by the presence of pathogenic microorganisms in such egg white solids.

Commercially separated egg white liquid contains varying quantities of bacteria depending upon the quality of the eggs used and upon the amount of care used in the extracting, separating, and handling steps. Total bacterial counts of egg white liquid range from as low as 10,000 bacteria per gram in a careful separation operation to as high as 10,000,000 or more per gram under poor separating conditions. In the course of processing and drying the separated egg whites, a large number of these microorganisms survive and are present in the finished dried egg albumen. Some of these bacteria may be of a pathogenic or disease causing nature. Salmonella is an example of one type of disease causing bacteria which has been isolated from egg products and Salmonella has been found with a fairly high incidence in egg albumen solids. Previous attempts to reduce bacteria counts and to thus eliminate pathogens have been unsuccessful.

The heat-sensitive nature of egg albumen has prevented the heating of the liquid egg albumen to temperatures above 135° F. Heating of the dried egg albumen solids reduces bacteria counts to a limited extent but does not insure a satisfactory reduction of pathogenic bacteria. The reduction of the bacterial count in dried egg albumen is particularly important since the dried albumen is extensively used in food preparation where little or no heat is applied, such as in the preparation of meringue garnishes or topping for pastry. Thus the normal safeguard residing in the necessity for heating many food products during which bacteria are destroyed is not present with dried egg albumen and the preparation and storage of meringue topped or similar products allows an increase in the already dangerous amounts of bacteria liable to be present in dried egg albumen.

Accordingly, an object of the present invention is to provide a method of reducing the bacterial count of dried egg albumen to very low levels to eliminate the danger resulting from the presence of pathogenic microorganisms in dried egg alubumen.

Another object of the present invention is to provide a method of reducing the bacterial count of dried egg albumen to very low levels without affecting its functional properties.

Another object of the present invention is to provide a method of reducing the bacterial count of egg white solids to bacterial counts below 1,000 bacteria per gram of solid.

It has been discovered that successive mild heat treatments of the egg albumen in the liquid and the solid state results in a very low bacteria count and in the elimination of pathogens such as Salmonella. This can be done without damage to the beating power or other functional properties of the egg whites. This method comprises an initial step of pasteurizing the fresh egg white liquid at temperatures slightly below those which would coagulate the protein (below 135° F.) with the liquid held at this temperature for a predetermined period. Thereafter, the glucose is removed by standard procedures and the liquid egg albumen is spray dried. The spray dried product is dry heat treated at temperatures between 110 and 140° F.

It is emphasized that both the pasteurization of the fresh liquid and the heat treatment of the finished product are necessary for the success of this method. Neither of these temperature treatments by themselves will give the desired effect of reducing the total bacterial count below 1,000 bacteria per gram with elimination of pathogenic bacteria such as Salmonella, and the reduction of the bacterial count resulting from the combined treatments is spectacularly greater than would be expected from the successive uses of the two treatments. Although the exact nature of the bacterial reduction is not fully understood, it is believed that the initial pasteurizing treatment makes the dried product peculiarly susceptible to the second heat treatment in a way that was not anticipated.

An example of the procedures used in handling the various steps of processing to produce a product with low bacteria count is as follows:

Egg albumen liquid (pH 7.5–9.0) is pasteurized at 130° F. with a holding time of one minute and twenty seconds. A suitable alkali, such as ammonium hydroxide or sodium hydroxide, may be used to adjust the pH, if necessary. This pasteurized liquid is cooled to 85° F. and treated with the enzyme deoxygenase and hydrogen peroxide to remove free glucose. When free of glucose, the liquid is spray dried under standard spray drying conditions. The dried product is then stored at 120° F. for seven days. After this period, the count is reduced to less than 300 bacteria per gram with no coliforms, yeast, mold, or Salmonella, detectable.

The above procedure has been successfully carried out on forty commercial batches of egg white (15,000 lb. per batch) which have had initial total counts ranging from 15,000 per gram to 2,000,000 per gram.

Following are typical results from one series of tests, all from the same original fresh egg white liquid:

| | Microorganisms, Count per gram | | | | |
|---|---|---|---|---|---|
| | Total | Coliform | Yeast | Mold | Salmonella |
| Fresh Egg White Liquid Before Pasteurization | 500,000 | 25,000 | 30 | 50 | 0.072 |
| Egg White Solids from Unpasteurized Liquid—no dry heat treatment | 120,000 | 300 | 20 | 30 | 0.03 |
| Egg White Solids from Unpasteurized Liquid—Dry Heat Treated at 120° F. for 7 days | 25,000 | LT (Less than) 10 | LT 10 | 20 | 0.03 |
| Fresh Egg White After Pasteurization at 130° F. for 1 min. 20 sec. holding time | 5,000 | LT 10 | LT 10 | LT 10 | LT 0.03 |
| Egg White Solids from Pasteurized Liquid—no dry heat treatment | 3,000 | LT 10 | LT 10 | LT 10 | LT 0.03 |
| Egg White Solids from Pasteurized Liquid—Dry Heat Treated 120° F. for 7 days | LT 300 | LT 10 | LT 10 | LT 10 | LT 0.03 |

The functional properties of the egg white solids were also not affected by the series of treatments resulting in the last product shown in the above table. In testing in angel cakes, beating time and cake volume were as good as with any of the unheat-treated or partially heated samples.

In the above example, optimum temperatures and times have been used in the pasteurizing and dry heat treatments. Tests have shown that the pasteurizing temperatures may be varied from 124° F. to 135° F. Above 135° F. the liquid tends to coagulate. The holding times may be varied from 10 seconds to 5 minutes. The bacterial reduction is greater as the holding time is increased; however, beyond 1 minute and 30 seconds the reduction becomes less significant.

The dry heat treatment may be done at temperatures between 110° F. and 140° F. Increased bacterial reduction results from longer time periods; however, beyond a period of 7 days the reduction becomes less significant. Shorter periods between 1 and 7 days provide significant reductions in the bacterial count when the dried product has been previously subjected to the above-described pasteurization treatment. A period of five days has given good results with a temperature of 140° F.

It will be seen that applicant discloses a novel method of reducing the bacterial count for egg white solids. This method successfully reduces the bacterial count of egg white solids to levels of below 1,000 bacteria per gram and eliminates the danger resulting from the presence of pathogenic microorganisms in egg white solids. The method is relatively easily performed during the preparation of the egg white solids and the bacterial count is significantly reduced without disturbing the functional properties of the egg white solids, such as the beating time and the cake volume properties where the solid egg whites are used in the preparation of angel food cakes.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. The method of reducing the bacterial count of egg white solids which comprises the steps of pasteurizing the liquid egg white at temperatures of about 124° F. to 135° F. for a period up to five minutes, cooling the pasteurized liquid egg white, removing the free glucose from the cooled liquid egg white, drying the pasteurized egg white, and heating the dried egg white solids for more than one day at temperatures of about 110° F. to 140° F.

2. The method of reducing the bacterial count of egg white solids which comprises the steps of pasteurizing the liquid egg white using a temperature of 124° F. to 135° F. for a period of 10 seconds to five minutes, cooling the pasteurized liquid to about 85° F., removing the free glucose from the cooled liquid egg white, drying the pasteurized egg white, and heating the dried egg white solids at temperatures of about 110° F. to 140° F. from one to seven days.

3. The method of claim 2 which further comprises the step of adjusting the pH of the liquid egg white to 7.5–9.0.

References Cited in the file of this patent

UNITED STATES PATENTS

| | | |
|---|---|---|
| 2,087,985 | McCharles et al. | July 27, 1937 |
| 2,427,726 | Hopkins et al. | Sept. 23, 1947 |
| 2,610,918 | Kline et al. | Sept. 16, 1952 |
| 2,758,933 | Shaffer | Aug. 14, 1956 |

FOREIGN PATENTS

| | | |
|---|---|---|
| 606,292 | Great Britain | Aug. 11, 1948 |
| 681,443 | Great Britain | Oct. 22, 1952 |